(12) United States Patent
Nemoto et al.

(10) Patent No.: US 6,875,540 B2
(45) Date of Patent: Apr. 5, 2005

(54) LITHIUM SECONDARY BATTERY

(75) Inventors: Hiroshi Nemoto, Nagoya (JP);
Teruhisa Kurokawa, Ama-gun (JP);
Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 265 days.

(21) Appl. No.: 09/870,372

(22) Filed: May 30, 2001

(65) Prior Publication Data

US 2001/0051297 A1 Dec. 13, 2001

Related U.S. Application Data

(63) Continuation-in-part of application No. 09/114,323, filed on Jul. 13, 1998, now Pat. No. 6,344,292.

(30) Foreign Application Priority Data

Jul. 29, 1997 (JP) .............................................. 9-202963
Dec. 2, 1997 (JP) .............................................. 9-331537

(51) Int. Cl.$^7$ ......................... H01M 2/08; H01M 2/04; H01M 2/30
(52) U.S. Cl. ...................... 429/184; 429/174; 429/177; 429/181; 429/185
(58) Field of Search ................................ 429/164, 174, 429/178, 180, 181, 184, 185, 177

(56) References Cited

U.S. PATENT DOCUMENTS

| | | | | |
|---|---|---|---|---|
| 3,713,896 A | * | 1/1973 | Feldhake | 429/174 |
| 4,939,050 A | | 7/1990 | Toyosawa et al. | 429/241 |
| 5,156,930 A | | 10/1992 | Daio et al. | 429/53 |
| 5,171,647 A | * | 12/1992 | Dean et al. | 429/54 |
| 5,462,820 A | * | 10/1995 | Tanaka | 429/174 |
| 5,571,632 A | | 11/1996 | Teramoto | 429/94 |
| 5,589,293 A | | 12/1996 | Pope et al. | 429/172 |
| 5,624,771 A | * | 4/1997 | Sano et al. | 429/173 |
| 5,900,331 A | * | 5/1999 | Krieger | 429/112 |
| 6,139,986 A | * | 10/2000 | Kurokawa et al. | 429/61 |
| 6,344,292 B1 | * | 2/2002 | Nemoto et al. | 429/56 |
| 6,387,561 B1 | | 5/2002 | Nemoto et al. | 429/51 |
| 2001/0049054 A1 | * | 12/2001 | Enomoto et al. | 429/158 |
| 2002/0006540 A1 | | 1/2002 | Enomoto et al. | 429/53 |
| 2003/0035993 A1 | * | 2/2003 | Enomoto et al. | 429/66 |

FOREIGN PATENT DOCUMENTS

| | | |
|---|---|---|
| EP | 0 266 541 A1 | 5/1988 |
| EP | 0 690 517 A1 | 1/1996 |
| EP | 0 771 040 A2 | 5/1997 |
| EP | 0 855 752 A2 | 7/1998 |
| JP | 60-035452 * | 2/1995 |
| JP | 2000-149886 * | 5/2000 |

* cited by examiner

Primary Examiner—Jonathan Crepeau
(74) Attorney, Agent, or Firm—Burr & Brown

(57) ABSTRACT

A lithium secondary battery comprising a case, an internal electrode body inside the case, electrolyte contained in the case, and an insulator between the case and a terminal. Also, a lithium secondary battery comprising a body member, electrolyte contained in the body member, an internal electrode body inside the body member, an and cap and an insulator between the body member and the end cap. In each battery, the internal electrode body comprises a positive electrode, a negative electrode and a separator between the electrodes, being electrically insulated from each other. In each battery, a first terminal is electrically connected to the negative electrode, and a second terminal is electrically connected to the positive electrode. The insulator comprises ethylene-propylene rubber, has surface hardness of from 30 (durometer A) to 60 (durometer D), and has volume resistivity of at least $10^{10}$ Ω-cm.

15 Claims, 2 Drawing Sheets

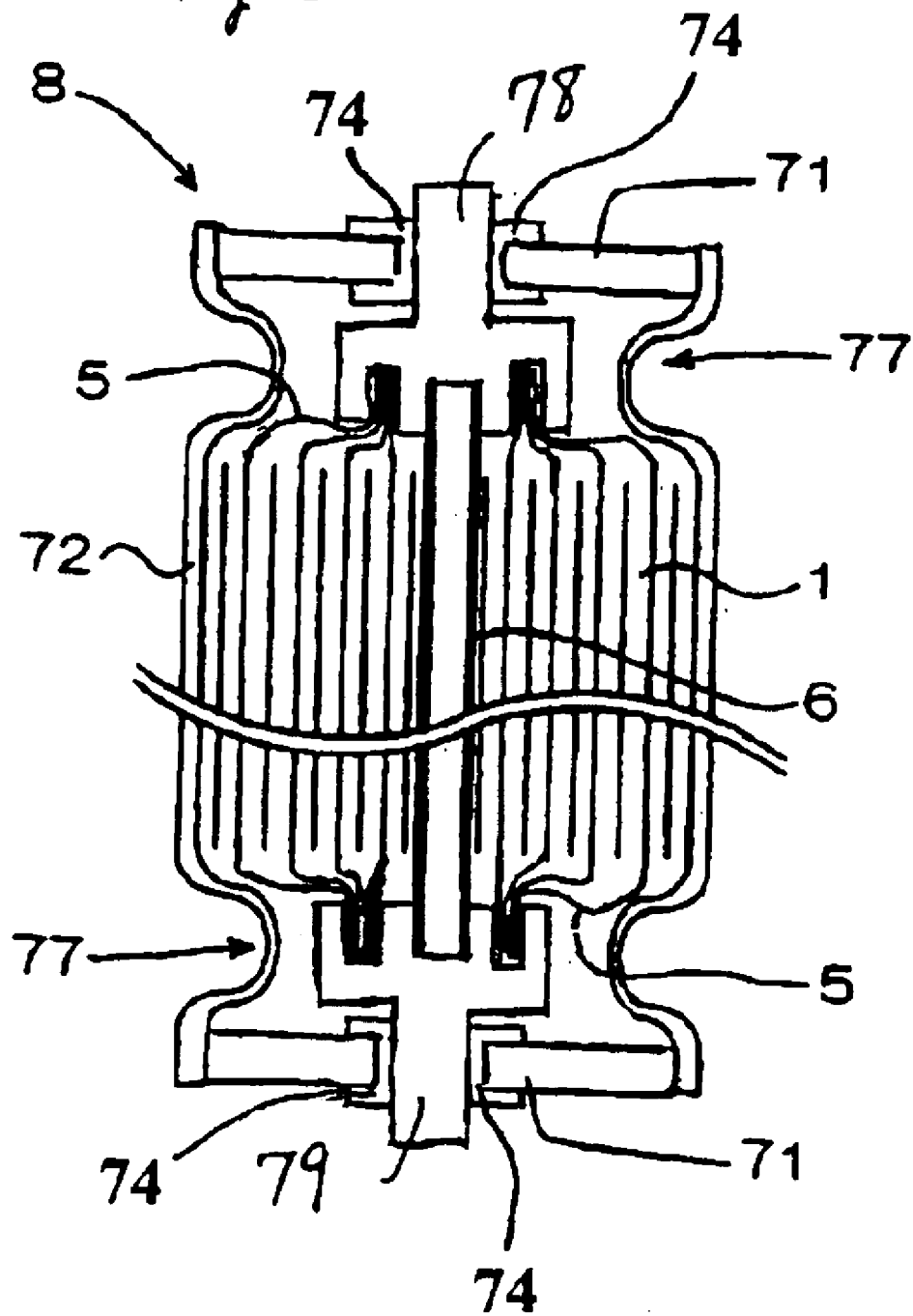

LITHIUM SECONDARY BATTERY

CROSS REFERENCE TO RELATED APPLICATION

The present application is a continuation-in-part of U.S. patent application Ser. No. 09/114,323, filed Jul. 13, 1998, now U.S. Pat. No. 6,344,292 the entirety of which is hereby expressly incorporated by reference.

The present application corresponds to Japanese Patent Application JP-A-2000-149886 laid-open on May 30, 2000, the entirety of which is hereby expressly incorporated by reference.

BACKGROUND OF THE INVENTION

Technical Field of the Invention

The present invention relates to a lithium secondary cell which is improved in reliability by increasing sealing performance with a material having desired surface hardness and good corrosion resistance against electrolyte solution as a sealing member for a cell case and which allows production costs to be reduced by improvement in productivity.

In recent years, in the midst of increasing desperate demand for regulation on emission of exhaustion gas, which is emitted from combustion engines and which contains carbon dioxide and other toxic substances, and increased interest in energy saving with intensification in environmental protection movements as a background, there has been an increasingly active movement to promote introduction of electric vehicles (EV) and hybrid electric vehicle (HEV) into the market to replace conventional automobiles which use fossil fuels such as gasoline.

As a cell to drive motors of this EV and HEV, a lithium secondary cell with high energy density is regarded as promising. Here, since voltages of 100V or more and preferably 200V or more are required in order to drive motors such as EVs, a plurality of batteries need to be brought into connection in series for use. Accordingly, since a large number of batteries are needed for one EV, it will be an important issue to keep the unit price for cell low for proliferation of EVs.

SUMMARY OF THE INVENTION

There are two general ways to attempt to reduce the costs for batteries, namely, reducing the costs for materials to be used, and reducing production costs by way of improvement in productivity. Cost reduction in materials is limited by the need to provide a predetermined cell performance, but the reduction in production cost is regarded to enable sizable cost reduction with cell structure and production steps. From such a point of view, the present inventors have proposed to use a pipe as a body member of a cell case with the two ends of the body member undergoing crimping to sandwich a cap to seal the cell as a cell structure which can be produced at a high rate of production cell structure with low production costs as well as a production method.

Tight sealing performance must be secured so that liquid leakage of electrolyte solution cannot take place, e.g., between the cell case and the cell terminal, or between a body member of the cell (e.g., a pipe) and end caps of the cell. It is necessary, therefore, to ensure that vaporous electrolyte solution cannot leak when the pressure within the cell is within a range of permissible inner pressure, even when the cell temperature is elevated to cause evaporation of the electrolyte solution and consequent inner pressure increase.

In accordance with the present invention, an insulator is provided to perform the sealing function, the insulator comprising ethylene-propylene rubber (EPR). In preferred embodiments of the present invention, a cell comprises a case (comprising a body member, e.g., a pipe, and one or more end cap) and one or more terminals, and one or more insulator is provided between the cell case and the or each cell terminal. In other preferred embodiments of the present invention, a cell comprises a body member and one or more end cap having a terminal, and one or more insulator is provided between the body member and the or each end cap. Accordingly, the insulators of the present invention seal the cell to prevent electrolyte solution, including vaporous electrolyte solution, from escaping from the cell, while insulating between the body member of the cell and the one or more terminals of the cell, and enable positioning of the one or more electrode terminals so as to carry out current. The cells according to the present invention can be made at preferable rates of productivity.

The insulators of the present invention provide the necessary hardness, intensity and elasticity, etc. so as to fix the one or more end cap to the body member, or to fix the one or more terminal to the case sufficiently firmly and have good sealing performance. In addition, the insulators of the present invention provide excellent chemical stability against the electrolyte solution, without which sealing performance cannot be maintained well for a long period. Moreover, for batteries with large cell capacity, a cell shape naturally gets large and widens the sealing area, that is, the area to undergo crimping, giving rise to a problem that a partial sealing leakage is apt to take place due to crimping inaccuracy and widening area of contact portion between the insulator and the electrolyte solution.

The present invention has been provided in view of the above described problems, and an objective thereof is to provide a lithium secondary cell in which insulators made of EPR are used to improve sealing performance of the cell, to provide stability over long periods, and to provide excellent reliability. That is, according to the present invention, there is provided is a lithium secondary cell constructed by containing in a cell case an internal electrode body and filling the cell case with non-aqueous electrolyte solution, the internal electrode body being structured by winding around an outer periphery of a winding core at least one positive electrode (e.g., a plate), at least one negative electrode (e.g., a plate) and at least one separator positioned between the at least one positive electrode and at least one negative electrode. The insulator material comprises EPR, preferably consists essentially of EPR or consists of EPR, and preferably has a surface hardness of from 30 (durometer A) to 60 (durometer D).

Incidentally, in the above described lithium secondary cell of the present invention, such an EPR material is used which has volume resistivity of $10^{10}$ Ω-cm or more.

Aluminum is a preferred material for constructing the body member of the cell according to the present invention.

The above-described lithium secondary cell of the present invention, which is superior in productivity, can be manufactured at a low cost and provides excellent long-term reliability, and is therefore suitably used as a power source for motor driving of electric vehicles or hybrid electric vehicles. The lithium secondary cell of the present invention is suitably adopted to a comparatively large cell with cell capacity of 2 Ah or more.

BRIEF DESCRIPTION OF THE DRAWINGS

FIG. 3 is a schematic sectional view showing a second embodiment of a cell structure suitably adopted for a lithium secondary cell of the present invention.

DETAILED DESCRIPTION OF PREFERRED EMBODIMENTS OF THE INVENTION

Figure 1:
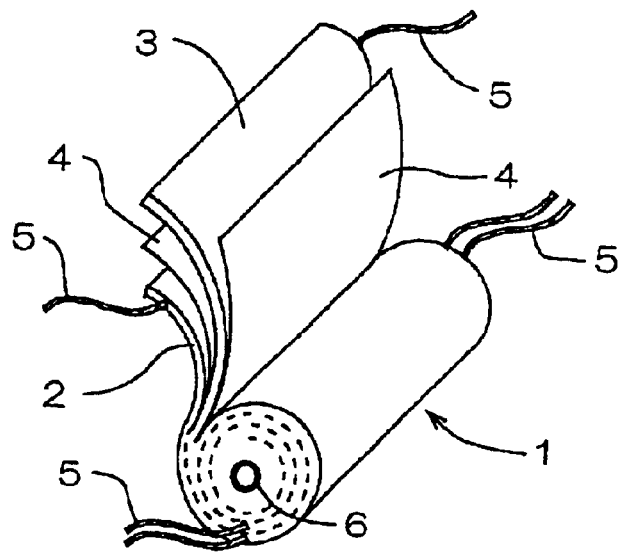
FIG. 1 is a perspective view showing an embodiment of a structure of an internal electrode body suitably used for a lithium secondary cell of the present invention.

An embodiment of an internal electrode body suitably used as a lithium secondary cell of the present invention is as shown in FIG. 1 formed by winding a positive electrode plate 2 and a negative electrode plate 3 around an outer periphery of a winding core 6 via a separator 4. Here, the positive electrode plate 2 and the negative electrode plate 3, which are, e.g., metal foils made of aluminum of titanium, etc. and made of copper or nickel, etc. respectively as electrode substrates (electricity collection body), are produced by forming electrode active substance layers on both sides of the respective electrode substrates.

As the positive active substance, a lithium transition metal compound oxide, such as lithium cobalt oxide ($LiCoO_2$), lithium nickel oxide ($LiNiO_2$), or lithium manganese oxide ($LiMn_2O_4$) etc. is suitably used. Here, in order to improve conductivity of these positive active substances, it is preferable to mix carbon powder such as acetylene black and graphite powder, etc. into the electrode active substances.

As the negative active substance, an amorphous carbon material such as soft carbon or hard carbon, or carbon powder such as artificial graphitized carbon or natural graphite is preferably used. The electrode active substances of these respective electrodes are made into a slurry and are coated onto both sides of the respective electrode substances so that the positive electrode plate 2 and the negative electrode plate 3 are produced.

In addition, the tabs 5 are attached to one side of the respective electrode substrates of the positive electrode plate 2 and the negative electrode plate 3 with means such as ultrasonic wave welding, etc., preferably at the time when the positive electrode plate 2 and the negative electrode plate 3 together with the separator 4 are wound. At this time, when one end surface is provided with the tab 5 for the positive electrode and the other end surface with the tab 5 for the negative electrode, short-circuiting between the tabs 5 respectively for the positive electrode and the negative electrode is prevented while the positive and negative electrode terminals will be easily disposed respectively to the both ends of the cell. Incidentally, in order that the portions where the tabs 5 in the positive electrode plate 2 and the negative electrode plate 3 are attached will not swell toward the external periphery side when the internal electrode body 1 is produced, thin band-shaped tabs 5 are used and are preferably disposed approximately at equal distances apart from each other so that each collects electricity from approximately equal areas in the electrode plates 2 and 3. In addition, the material of the tabs 5 is normally to be the same quality of material as that for the electrode substrate to which the tabs 5 are attached.

A preferred structure for the separator 4 is a three-layered structure in which a polyethylene film (PE film) having lithium ion permeability and including micropores is sandwiched between porous polypropylene films (PP films) having lithium ion permeability. This structure serves also as a safety mechanism in which if the temperature of the internal electrode body 1 is raised excessively, the PE film is softened at about 130° C. so that the micropores are collapsed to suppress the movement of lithium ions, thereby suppressing the cell reaction. In addition, by sandwiching this PE film between the PP films having a higher softening temperature, even if the PE film is softened, contact/short-circuiting between the positive electrode plate 2 and the negative electrode plate 3 is prevented, and reliable control of cell reaction and safety are ensured because the PP films hold their shape.

As the winding core 6, a cylindrical one is preferably used, and normally a cylindrical pipe is suitably used as the cell case since in this case the internal electrode body 1 will become cylindrical. In a preferred sequence of manufacture, the internal electrode body 1 is inserted into the body member, one end of the body member is sealed (e.g., by attaching at least an end cap to the body member), a non-aqueous electrolyte solution (hereinafter to be referred to as "electrolyte solution") is impregnated in the internal electrode body 1, and the other end of the body member is then sealed. Alternatively, one end or both ends of the body member and/or end caps may be provided with an electrolyte solution injection port, through which electrolyte solution may be fed into the casing after both ends of the body member have been sealed.

As the electrolyte solution, suitable materials include a carbonate such as ethylene carbonate (EC), diethyle carbonate (DEC), dimethyle carbonate (DMC) and an organic electrolyte solution including a single solvent or a mixture solvent of organic solvents such as propylene carbonate (PC), γ-butyrolactone, tetrahydrofran, and acetonitrile, to which one or more kinds of lithium complex fluoride compound such as $LiPF_6$ and $LiBF_4$ or lithium halide such as $LiClO_4$, or combinations thereof, as an electrolyte dissolved in a solvent. However, the above described respective kinds of members and materials are examples, and the present invention is not limited to these members and materials.

Figure 2:
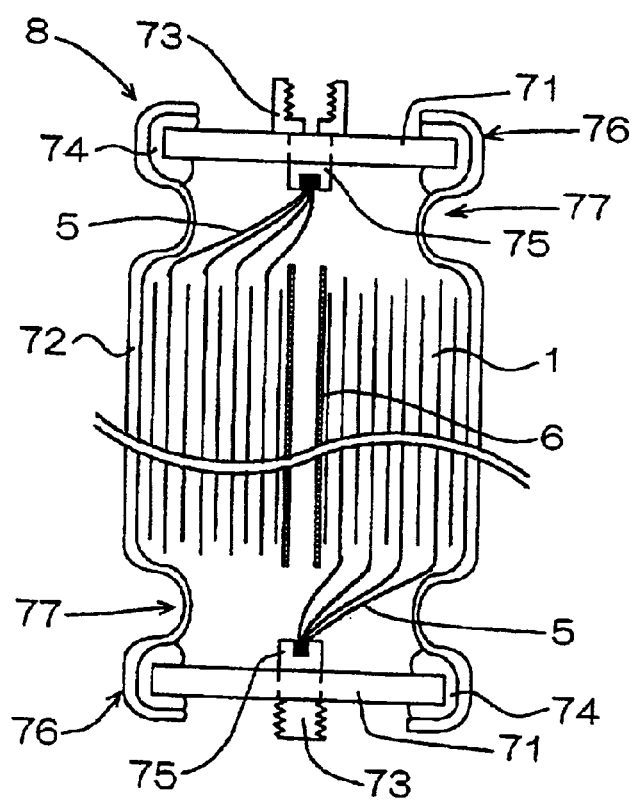
FIG. 2 is a schematic sectional view showing a first embodiment of a cell structure suitably adopted for a lithium secondary cell of the present invention.

The method of sealing the ends of the body member used in the cell case can be any of various kinds well known to those of skill in the art. A preferred method of sealing according to the present invention includes crimping the body member to clamp an end cap. FIG. 2 is a sectional view showing a schematic view of a structure of a preferred cell 8 according to the present invention, including an end cap 71 on either end of a body member 72. Each end cap includes an internal terminal 75 with which tabs 5 are brought into connection. Each end cap is clamped within a clamping portion 76 of the body member 72. Each clamping portion 76 is adjacent to a necking portion 77 which can facilitate crimping of the clamping portion 76, which is preferably carried out to improve the seal. An insulator 74 is provided between each end cap 71 and the adjacent clamping portion 76 of the body member 72.

The body portion 72 is preferably made of aluminum or a composition having aluminum as a main component, in which case the cell will be more lightweight and clamping and crimping will be easily executed. At the same time, aluminum is a preferable material from the standpoint of its corrosion resistance against the electrolyte solution since it can also be used as an electricity collecting body for the positive electrode plate 2. In addition, as the end caps 71, the internal terminals 75 and the electrode terminals 73, those with aluminum and copper as main components can be used respectively, but for the electrode terminals 73, which are eventually attached to the end caps 71 so as not to be brought into contact with the electrolyte solution, any metal materials can be used, and for the caps 71, insulating materials such as ceramics and hard resin, or other insulating materials well known to those of skill in the art are preferably used if conductivity between the internal terminal 75 and the electrode terminal 73 is secured.

As the sealing materials 74 to be used in the sealing portion 76, EPR with surface hardness of 30 (durometer A) to 60 (durometer D) is suitably used. With involvement of materials having such features, regardless of sealing area, that is, regardless of the outer diameter of the body member 72, liquid leakage of the electrolyte solution can be prevented with close sealing, and leakage of vaporous electrolyte solution at times when the internal pressure of the cell increases within a permissive range will be preventable.

On the other hand, as concerns the sealing materials 74, such a condition that is chemically stable toward the electrolyte solution and will not cause leakage, etc. of electrolyte solution due to corrosion, etc. when used as a cell is demanded as an important feature. Accordingly, use of EPR with surface hardness of 30 (durometer A) to 60 (durometer D) will improve both the sealing performance and durability and intensify reliability, and is most preferable.

Incidentally, use of EPR having thermal shrinkage, in particular, a thermal shrinkage tube can enhance the sealing performance well, can simplify the clamping operation and is preferable. In a method which takes advantage of this feature, in the cell structure shown in FIG. 2, prior to sealing of the pipe 72 with clamping, the end caps 71 are engaged inside a thin round slice made by cutting a thermal shrinkage tube and are heated so that the caps 71 with the sealing material 74 disposed around the external periphery thereof are easily produced, and these caps 71 in which these sealing materials 74 are disposed are disposed in the squeeze-processed portion 77 of the pipe 72 and the pipe 72 is caulked so that the pipe 72 can be sealed extremely easily. Incidentally, in case of using a thermal shrinkage tube, preferably the surface hardness following thermal shrinkage falls within the above described range and there is no limitation in the surface hardness prior to thermal shrinkage.

In addition, volume resistivity of the EPR is preferably $10^{10}$ Ω-cm or more, in which case, in particular, where electrode terminals 73 are attached to the caps 71 as shown in FIG. 2, the pipe 72 and the caps 71 are insulated well, and accordingly insulation between the pipe 72 and the electrode terminals 73 will be secured. Thus, using the sealing materials 74 to serve to seal the electrolyte solution and provide insulation between the pipe 72 (the body member) and the caps 71 (cap members) in the cell case, that is, to provide with two kinds of functions, it is preferable in that the cell structure can be simplified and manufacturing steps can be simplified.

As described above, as the sealing materials 74, EPR having a predetermined surface hardness and corrosion resistance is used so that cells can be produced with improved productivity and cost is lowered and, nevertheless, excellent in long-term reliability will become available. Thus, the lithium secondary cell according to the present invention is suitably used as a power source for driving a motor of an EV or an HEV. In addition, considering characteristics of the above described cell structure and manufacturing method, the present invention is suitably adopted to comparatively large cells with cell capacity of 2 Ah or more.

So far, embodiments of the lithium secondary cell of the present invention have been described, and it goes without saying that the present invention will not be limited to the above described embodiments. That is, characteristics of the sealing materials are not only suitably used for sealing the end portions of a cylindrical cell but also can be suitably used as the sealing materials of the sealing portion which executes clamping processing also in a cell case shaped otherwise, which is imaginable without difficulty. For example, it can be suitably used as the sealing material in the case where a plurality of layers or so of a positive electrode plate and a negative electrode plate having a constant area are alternately laminated via separators to form an internal electrode body which is contained in a box-shaped container and one face of the box-shaped container undergoes clamping processing and is sealed. In this case, such a state can be nominated that a sealing material suitably used in the present invention is sandwiched in by a cap covering one open face and a side face constructing outer periphery of this open one face to give rise to a state that an end portion of this side face undergoes clamping processing to fix the cap.

For example, a second preferred embodiment of the present invention is shown in FIG. 3, in which parts which are analogous to parts in FIG. 2 are designated with the same reference numbers. FIG. 3 is a sectional view showing a schematic view of a structure of a second embodiment of a preferred cell 8 according to the present invention, including an end cap 71 on either end of a body member 72. In this embodiment, the end caps 71 are preferably welded to the respective ends of the body member 72 adjacent to a necking portion 77 on each end. Positive and negative terminals 78 and 79 are provided at the respective ends of the cell, the positive terminal 78 being connected to tabs 5 connected to the positive electrode in the internal electrode body 1, the negative terminal 79 being connected to tabs 5 connected to the negative electrode in the internal electrode body 1. An insulator 74 is provided between each end cap 71 and each terminal 78, 79.

As described above, in the lithium secondary cell of the present invention, in spite of adopting simple clamping method to seal a cell, EPR shows good sealing performance and is excellent in corrosion resistance, therefore providing a cell that is excellent in reliability and is excellent in productivity. In addition, the cell structure being simple and productivity being excellent serve to give rise to an excellent effect that manufacturing can be executed inexpensively.

What is claimed is:

1. A lithium secondary battery comprising:
   a case;
   an internal electrode body positioned inside said case, said internal electrode body comprising at least one positive electrode, at least one negative electrode and at least one separator interposed between said positive electrode and said negative electrode, said positive electrode and said negative electrode being electrically insulated from each other;
   at least one electrolyte contained inside said case;
   a first terminal electrically connected to said negative electrode;
   a second terminal electrically connected to said positive electrode; and
   at least one insulator positioned between said case and at least one of said first and second terminals, said insulator comprising ethylene-propylene rubber, said insulator having a surface hardness of from 30 (durometer A) to a 60 (durometer D), and said insulator material having a volume resistivity of at least $10^{10}$ Ω-cm.

2. A lithium secondary battery as recited in claim 1, wherein said case comprises a body member and at least a first end cap, said first end cap being positioned at a first end of said body member, said insulator being positioned between said first terminal and said first end cap.

3. A lithium secondary battery as recited in claim 2, wherein said body member is generally cylindrical.

4. A lithium secondary battery as recited in claim 2, wherein said body member has a first crimped portion in which said first end cap is clamped.

5. A lithium secondary battery as recited in claim 1, wherein said case comprises a body member, a first end cap and a second end cap, said first end cap being positioned at a first end of said body member, said second end cap being positioned at a second end of said body member, said internal electrode body being positioned between said first and second end caps, said insulator being positioned between one of said first and second terminals and an adjacent one of said first and second end caps.

6. A lithium secondary battery as recited in claim 5, wherein said body member is generally cylindrical.

7. A lithium secondary battery as recited in claim 5, wherein said body member has a first crimped portion in which said first end cap is clamped, and a second crimped portion in which said second end cap is clamped.

8. A lithium secondary battery as recited in claim 5, wherein said at least one insulator is positioned between said first end cap and said first terminal, and a second insulator is positioned between said second end cap and said second terminal.

9. A lithium secondary battery comprising:

a body member;

an internal electrode body positioned inside said body member, said internal electrode body comprising at least one positive electrode, at least one negative electrode and at least one separator interposed between said positive electrode and said negative electrode, said positive electrode and said negative electrode being electrically insulated from each other;

at least one electrolyte contained inside said body member;

a first terminal electrically connected to said negative electrode;

a second terminal electrically connected to said positive electrode;

at least one end cap; and at least one insulator positioned between said body member and said at least one end cap, said insulator comprising ethylene-propylene rubber, said insulator having a surface hardness of from 30 (durometer A) to 60 (durometer D), and said insulator material having a volume resistivity of at least $10^{10}$ Ω-cm.

10. A lithium secondary battery as recited in claim 9, wherein said body member is generally cylindrical and said at least one end cap is positioned at a first end of said body member.

11. A lithium secondary battery as recited in claim 10, wherein said body member has a first crimped portion in which said first end cap is clamped.

12. A lithium secondary battery as recited in claim 9, wherein said at least one end cap is positioned at a first end of said body member, said battery further comprising a second end cap positioned at a second end of said body member, said internal electrode body being positioned between said first end cap and said second end cap.

13. A lithium secondary battery as recited in claim 12, wherein said body member is generally cylindrical.

14. A lithium secondary battery as recited in claim 12, further comprising a second insulator positioned between said second end cap and said body member, said second insulator comprising ethylene-propylene rubber.

15. A lithium secondary battery as recited in claim 12, wherein said body member has a first crimped portion in which said first end cap is clamped, and a second crimped portion in which said second end cap is clamped.

* * * * *